United States Patent
Buhrmann et al.

[15] 3,682,202
[45] Aug. 8, 1972

[54] REINFORCED HOSE

[72] Inventors: Wayne H. Buhrmann, Martell, Nebr. 68404; Sidney R. Fix, Lincoln, Nebr. 68505

[73] Assignee: The Goodyear Tire & Rubber Company, Akron, Ohio

[22] Filed: Jan. 22, 1970

[21] Appl. No.: 5,029

[52] U.S. Cl. ................................................. 138/126
[51] Int. Cl. ............................................. F16l 11/08
[58] Field of Search ........................................ 66/9 A; 138/123–26

[56] References Cited

UNITED STATES PATENTS

| | | | |
|---|---|---|---|
| 348,698 | 9/1886 | Sibley | 138/123 X |
| 2,040,058 | 5/1936 | Mendel et al. | 66/176 |
| 2,512,433 | 6/1950 | Lehen | 138/126 |
| 2,749,943 | 6/1956 | Nemeth | 138/125 |
| 2,788,804 | 4/1957 | Larkin | 138/125 |
| 2,906,638 | 9/1959 | Herman | 138/126 UX |

*Primary Examiner*—Edward J. Earls
*Attorney*—F. W. Brunner and Ronald P. Yaist

[57] ABSTRACT

An improved collapse-resistant, reinforced hose of flexible polymeric material including a semi-rigid generally circumferentially disposed supporting structure which includes preferably a single layer of textile fabric reinforcement, the major portion of which is composed of treated polyester or nylon fibers. The polyester or nylon fibers are treated with an organic polyisocyanate and preferably a solution of at least 2 percent organic polyisocyanate in a non-reactive solvent. The hose has substantially improved bursting strength and resistance to vacuum collapse without the need of additional support, such as a metal wire insert. The invention is particularly useful for flexible radiator hoses used in automotive vehicle cooling systems.

14 Claims, 5 Drawing Figures

Patented Aug. 8, 1972
3,682,202
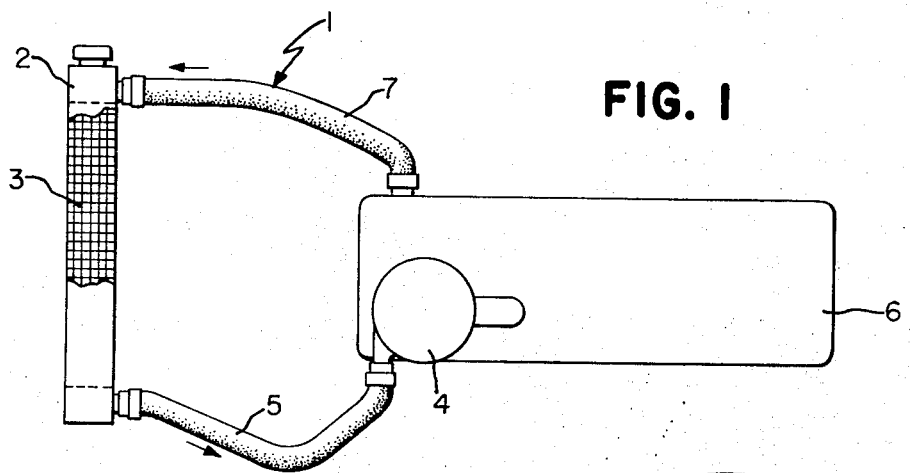
FIG. 1
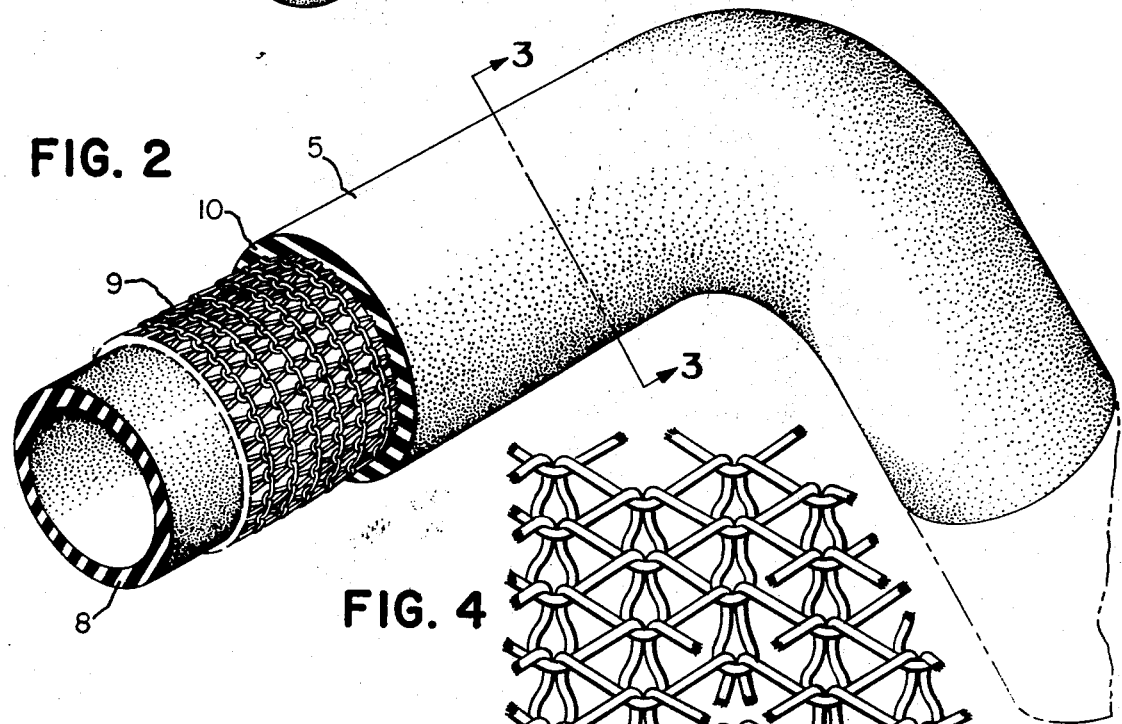
FIG. 2
FIG. 4
FIG. 5
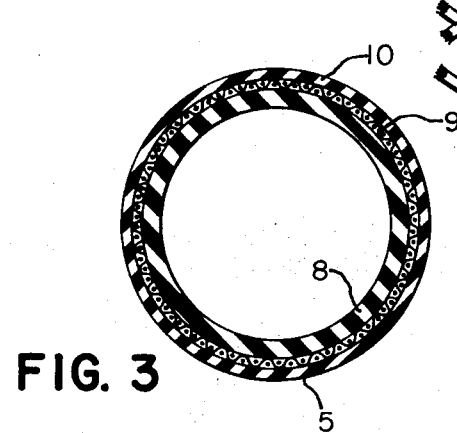
FIG. 3
INVENTORS
WAYNE H. BUHRMANN
SIDNEY R. FIX
BY
*R P Yoist*
ATTORNEY

REINFORCED HOSE

This invention relates to improved collapse-resistant reinforced hoses of flexible polymeric material and more specifically to a radiator hose which is reinforced preferably by a single layer of treated polyester or nylon fabric. This invention has particular application to such a radiator hose which has improved bursting strength and resistance to vacuum collapse when subjected to a continuously increasing vacuum.

In modern water or liquid cooled vehicle engines, the cooling systems include reinforced hoses of flexible material through which cooling liquids circulate both from and to the radiator. For instance, a radiator outlet hose usually connected to the lower portion of the radiator provides a conduit for the water or other cooling liquid contained in the radiator which is drawn through the cooling system by means of the suction created by a water pump. A radiator inlet hose usually connected to the upper portion of the radiator also provides means for liquid flow from the engine block into the radiator after the circulating liquid absorbs heat from the vehicle engine.

These radiator hoses are commonly composed of a length of natural or synthetic polymeric material, such as rubber or the like, reinforced by a circumferentially disposed layer of knitted textile fabric, usually of cotton or rayon. This type hose is normally vulcanized on a curved mandrel so that a corresponding curve or bend is formed in the hose length to facilitate its installation in the vehicle cooling system. Since these hoses must have a relatively high degree of flexibility in order to be properly positioned in the cooling system and furthermore, to be able to withstand vibrations during the operation of the vehicle, they necessarily have a relatively thin wall thickness, for example, from about 0.15 to about 0.25 of an inch, and preferably from about 0.17 of an inch to about 0.22 of an inch and, therefore, usually include only a single layer of fabric reinforcement. On the other hand, the flexible radiator hoses require a relatively high strength reinforcement since they must have a relatively high bursting strength when subjected to hydrostatic pressure in order to function properly in the vehicle cooling system. The reinforcement also prevents substantial elongation of the hose.

Those skilled in the art are aware that a common problem associated with present radiator hose construction is the tendency of the hose to collapse when subjected to a continuously increasing vacuum. For example, the suction created by the operation of the water pump often results in the collapse of the lower or radiator outlet hose. A similar problem likewise exists with the upper or radiator inlet hose which sometimes tends to collapse after the vehicle engine is shut off and cools down since the resulting reduced temperature causes a reduced pressure in the cooling system. In order to prevent the hoses from collapsing, it has been the practice to insert a sinuous or helical metal wire coil inside the hose prior to its installation in the cooling system thereby providing the needed support. However, this practice increases the manufacturing cost of the hose and in addition the wire insert is subject to corrosion.

It is, therefore, an object of this invention to provide a flexible polymeric hose of relatively thin wall gauge and having preferably only a single layer of reinforcement which will exhibit a maximum degree of flexibility but still resist collapse when subjected to a continuously increasing vacuum.

It is another object of this invention to provide a radiator hose having an increased bursting strength and resistance to vacuum collapse when subjected to a continuously increasing vacuum while installed in a vehicle cooling system without the need of additional support, such as a metal wire insert.

Other objects and advantages of this invention will become apparent hereinafter as the description thereof proceeds, the novel features, arrangements and combinations being clearly pointed out in the specification as well as the claims thereunto appended.

It has been found that the before-mentioned objects of this invention are accomplished by providing a reinforced hose of flexible polymeric material including a semi-rigid generally circumferentially disposed supporting structure comprising a single layer of textile fabric, the major portion of which is composed of polyester or nylon fibers which have been treated as hereinafter described. The hose, because of the supporting structure, exhibits improved bursting strength and vacuum collapse resistance without the use of a metal wire insert or other support. For example, a hose having an inside diameter of about 1½ inches and a wall thickness of from about 0.15 of an inch to about 0.25 of an inch is capable of withstanding a vacuum pressure of at least 12 inches of mercury when at least a 6 inch section thereof is subjected to a continuously increasing vacuum at room temperature. By the same token, a hose of the same wall thickness having an inside diameter of about 1¾ inches is capable of withstanding a vacuum pressure of at least 6 inches of mercury when tested in the same manner.

It has been found that the objects of this invention are further accomplished by providing an improved vulcanized radiator hose having an inside diameter of from about ⅞ of an inch to about 3 inches and a wall thickness of from about 0.15 to about 0.25 of an inch and including a knitted fabric reinforcement consisting essentially of a single layer of treated polyester or nylon fibers which upon vulcanization forms a semi-rigid circumferentially disposed supporting structure for the hose. The hose is capable of an increased bursting strength when subjected to hydrostatic pressure and an increased resistance to vacuum collapse when subjected to a continuously increasing vacuum at room temperature.

The hose reinforcement is treated by the method which includes applying an organic polyisocyanate to the polyester or nylon fibers, and preferably a solution of at least 2 percent of an organic polyisocyanate in a non-reactive solvent is applied to the polyester or nylon fibers. More preferably, the polyisocyanate solution has a concentration of from about 10 percent to about 30 percent of polyisocyanate in a solvent selected from the group consisting of trichloroethylene, trichloroethane, and toluene.

The objects and advantages of the invention will become more apparent with reference to the drawings in which:

FIG. 1 is a diagrammatic illustration of a vehicle engine cooling system in which the hoses of this invention are particularly useful;

FIG. 2 is an enlarged perspective view of the hose of this invention with parts broken away to more clearly show its internal reinforcement;

FIG. 3 is a section taken on line 3—3 of FIG. 2;

FIG. 4 is a diagramatic illustration showing a preferred form of the knitted fabric construction for the hose of this invention; and FIG. 5 is a diagramatic illustration showing another preferred form of the knitted fabric construction for the hose of this invention.

In the drawings, FIG. 1 shows a vehicle engine cooling system 1 of the type used in an ordinary automobile having a standard internal combustion gasoline engine. The system includes a radiator 2 containing a cooling liquid 3, such as water, alcohol, or permanent antifreeze, and a pump member 4 in the form of an ordinary centrifugal water pump. A radiator outlet hose 5 connected to the lower portion of the radiator 2 provides a conduit through which the cooling liquid 3 is drawn due to the suction created by the pump member 4. The circulating liquid 3 flows in the direction indicated by the arrows through the engine block 6 absorbing the heat from the engine and returns to the radiator 2 through a radiator inlet hose 7 which is connected to the upper portion of the radiator 2. As previously described, without the use of the specially reinforced hoses of the present invention, both the radiator outlet hose 5 and the radiator inlet hose 7 are subject to collapse at different times during the operation of the cooling system unless they are adequately supported, for example, by an inserted metal wire coil. The radiator outlet hose 5 is most frequently subject to collapse, and, therefore, is most frequently provided with the wire reinforcement.

FIGS. 2 and 3 show the radiator outlet hose 5 of this invention prior to its installation in the cooling system 1 of FIG. 1. The hose 5 includes an extruded inner tube 8 of flexible polymeric material, such as natural or synthetic rubber or the like, having an inside diameter of about 1 inch to about 3 inches and a wall thickness of about 0.105 of an inch to about 0.125 of an inch. In this regard it has been found that special purpose synthetic elastomers, such as ethylene propylene terpolymer (EPDM), butyl and neoprene elastomers are suitable for this application. Ethylene propylene terpolymer (EPDM) elastomers because of their high degree of heat resistance and superior chemical resistance are especially suitable for this application.

The flexible polymeric materials that may be employed in the practice of the present invention to form the inner tube 8 include natural rubber and the synthetic rubbery polymers both homopolymers and copolymers, prepared from dienes, such as conjugated dienes and/or mono-olefins. Representative examples of the synthetic polymers which may be used in the practice of this invention are polychloroprene commonly referred to as neoprene; homopolymers of a conjugated 1,3-diene, such as isoprene and butadiene; and in particular, polyisoprenes and polybutadienes having essentially all of their segmeric units combined in a cis-1,4 structure; copolymers of a conjugated 1,3-diene, such as isoprene and butadiene with up to 50 percent by weight of at least one copolymerizable monomer, such as styrene and acrylonitrile; butyl rubber, which is a polymerization product of a major proportion of a mono-olefin and a minor proportion of a multi-olefin and a minor proportion of a multi-olefin, such as butadiene or isoprene; and polymers and copolymers of mono-olefins containing little or no unsaturation, such as rubbery ethylene propylene copolymers; or ethylene propylene terpolymers (EPDM). Representative examples of these rubbery terpolymers are described in U.S. Pat. No. 3,331,793, column 2, lines 54–59.

The hose 5 reinforcement consists of a single layer 9 of textile fabric, the major portion of which consists of treated polyester fibers or yarns preferably of a knitted construction to enable the hose 5 to be more easily bent and flexed. The specific knit pattern may be any one of several types well known in the art, such as regular lock stitch, diamond-lock stitch, half-wrap stitch, or other types. For example, it has been found that the diamond-lock stitch construction as shown in FIG. 4 and diamond lock wrap stitch construction as shown in FIG. 5 provide a very satisfactory reinforcement for the hoses of this invention.

The polyester fibers used in the present invention are fibers of high molecular weight linear polyester resin, such as fibers of polyethylene terephthalate (available from DuPont de Nemours & Co as Dacron, and from Fiber Industries as Fortrel), fibers of polycyclohexylene dimethylene terephthalate and fibers of terephthalate copolyesters containing up to 10 mol percent of a modifying ingredient. Suitable copolyesters are ethylene terephthalate-ethylene isophthalate copolyesters, ethylene terephthalate-ethylene 2,6-naphthalate copolyesters and ethylene terephthalate polyesters modified with small amounts of aliphatic dicarboxylic acids, such as adipic acid and sebacic acid.

The polyester material used to form the knit fabric layer 9 may be of any one of several constructions. For example, polyester fabric cords having a gauge of about 0.017 of an inch and a 2200 denier, 1100/2 with 5 to 10 turns per inch, S or Z construction, or a 2000 denier, 1000/2, 2.5 turns per inch. S or Z construction, are particularly satisfactory in this regard. The polyester fabric layer 9 is applied around the outer circumference of the inner tube 8 by means of a conventional knitting machine and normally includes about 11 to about 14 knits per inch. Of course, it should be noted that although a knit fabric construction is particularly suitable for radiator hose applications, in other type hose constructions the polyester fabric may be in the form of, for example, a square woven fabric or a helical cord wrap.

The knit fabric layer 9 is treated preferably with a solution of at least 2 percent organic polyisocyanate in a non-reactive solvent and preferably in the range of from about 10 percent to about 30 percent solution of polyisocyanate in a preferred solvent, such as trichloroethylene, trichloroethane, or toluene.

The organic polyisocyanates used in this invention include various organic diisocyanates and mixtures thereof. The organic polyisocyanates can be aromatic, aliphatic, or cycloaliphatic or combinations of these types.

Representative examples of such polyisocyanates include the toluene diisocyanates, m-phenylene diisocyanate, 4-chloro-1,3-phenylene diisocyanate, 4,4'-tetramethylene diisocyanate, 1,6-hexamethylene diisocyanate, 1,10-decamethylene diisocyanate, 1,4-cyclohexylene diisocyanate, 4,4'-methyl-one-bis(cyclohexylisocyanate) and 1,5-tetrahydronaphthalene diisocyanate, and mixtures of such diisocyanates. For the purposes of the present invention, the toluene-diisocyanates, diphenylmethane-4,4'-diisocyanate and 3,3'-dimethyl-4,4'-bisphenylene diisocyanate are preferred. Said isocyanates include commercial mixtures, such as 80/20 TDI isomers, liquid MDI, PAPI, and especially Mondur MR. In some respects an organic polyisocyanate having a functionality greater than 2, usually from about 2.5 to 3, may offer some technical advantages.

The solvents preferably have a boiling point of below 350° F. Representative examples of the solvents are aliphatic, cycloaliphatic and aromatic solvents, such as benzene, xylene and toluene; and the liquid lower ketones, such as acetone, methyl ethyl ketone, methyl isobutyl ketone, and diisobutyl ketone, and chlorinated solvents, such as trichloroethylene and trichloroethane. Preferably a nonflammable chlorinated solvent, such as trichloroethane, is used as the solvent.

The polyisocyanate solution may be applied by spraying, dipping, swabbing, or by some other coating means. The treatment may also be applied either before or after the knitting operation. For example, the knitted tube 9 may be totally immersed in a solution bath and allowed to dry for an appropriate length of time before further processing. It is also possible, and under some circumstances desirable, to treat the fabric material prior to its application to the inner tube, for instance, by passing the greige cord through the treating solution and heating the treated cord in an oven.

An outer cover 10 composed of a flexible polymeric material usually of the same type as that of the inner tube 8 is extruded over the knitted inner tube 8 in a conventional manner.

After application of the outer cover 10 to the hose 5 is cut to the desired length, usually about 18 to 24 inches, and is fitted over a suitable metal curing mandrel and vulcanized, for example, in open steam, in a shape corresponding to the shape of the mandrel with the final product normally including at least one curved portion or bend in its length. The curved configuration allows the hose to be more easily installed in a vehicle cooling system. The vulcanized hose 5 normally has an inside diameter of from about ⅞ of an inch to about 3 inches and a wall thickness of from about 0.15 of an inch to about 0.25 of an inch and preferably from about 0.17 of an inch to about 0.22 of an inch.

After vulcanization, the treated fabric layer 9 now is stiffer than the same fabric layer when untreated, thus forming a semi-rigid circumferential internal supporting structure for the hose 5. For some types of hose, the circumferential fabric layer 9 may also be the outer most layer of the hose with the hose including no outer cover or the layer could also be the innermost layer of the hose if desired. The hose 5 has greatly improved bursting strength and resistance to vacuum collapse when compared to radiator hose of conventional constructions. For example, conventional radiator hoses have a bursting strength of about 75 to about 125 psi when tested according to the method prescribed by the American Society for Testing and Materials ASTM D-380. The hoses of this invention have a bursting strength of at least 150 psi and ranging to over 200 psi. Moreover, it is known that conventional radiator hose constructions having an inside diameter of from about ⅞ on an inch to about 2¼ inches can, at the maximum, exhibit a vacuum-collapse resistance of only from about 3 to about 3½ inches of mercury when tested at room temperature in a manner which will be hereinafter described. On the other hand, the radiator hoses of this invention of this same size exhibit a vacuum-collapse resistance of greater than 3½ of mercury and under most circumstances, in fact, much in excess of 3½ inches when tested under the same conditions. For example, a hose of the present invention having an inside diameter of about 1-¾ inches can exhibit a vacuum collapse resistance of at least 6 inches of mercury. This value may be as high as 15 inches of mercury under some circumstances. Of course, it should be realized that the smaller the inside diameter of the hose the larger the vacuum-collapse resistance of the hose. For example, under normal circumstances a hose of this invention having an inside diameter of about 1½ inches will exhibit a vacuum-collapse resistance of at least 12 inches of mercury and possibly a resistance as high as 25 inches of mercury. In this regard, it should also be apparent that the thicker the wall gauge of the hose the greater is the vacuum-collapse resistance of the hose.

The following examples further illustrate the objects and advantages of this invention.

EXAMPLE I

Five groups of radiator hose samples having an inner diameter of about 1¾ inches were manufactured and are labeled A,B,C,D, and E, respectively. Hose A was manufactured as a regular production hose, and hoses B through E, similar to the hose represented by numeral 5 of FIG. 2 of the drawings, were manufactured in accordance with the present invention by the procedure as will be hereinafter described.

Five tubes, similar to the tube shown in FIG. 2 of the drawings, composed of a neoprene elastomeric compound suitable in a radiator hose application were extruded in a conventional manner. Each extruded tube had an inside diameter of about 1.75 inches and a thickness of from about 0.105 of an inch to about 0.125 of an inch and was extruded in about 500 foot lengths A conventional rayon textile fabric having a gauge of about 0.013 of an inch with a 1650 denier, 825/2, 2.5 turns per inch, Z twist construction was applied around the outer circumference of the extruded neoprene tubes of the hoses of group A on a conventional knitting machine customarily used in the production of hose of this type. The knitted tube of group A hoses was of a regular lock stitch construction having about 11 knits per inch. Similarly, an untreated or greige polyester cord having a gauge of about 0.017 of an inch with a 2200 denier, 1100/2, 10 turns per inch, S or Z twist construction was applied around the outer circumference of extruded neoprene tubes of hoses of groups B through E to form a lock stitch fabric construction as shown by numeral 9 in FIG. 2. The knitted tubes of hose groups B and D had a knit construction of 11 knits per inch which was the same as that of the tube of production hoses of group A while samples of groups C and E had knit construction of 14 knits per inch.

Each knitted tube of samples of groups B through E was then immediately treated as it came off the knitting machine by being dipped or immersed in a dip tank containing a bath or isocyanate solution having a concentration of about 25 percent polyisocyanate (available from Mobay Chemical Company as Mondur-MR) in commercially available trichloroethylene. The dipping process took place at approximately room temperature, for example, from about 65° F to about 85° F. The treated knit tubes were allowed to dry for about 24 hours.

After each tube and knit of hoses for groups B through E were dry a cover similar to that represented by numeral 10 of FIG. 2 was extruded over the knitted tubes of hoses for groups A through E. Each cover was composed of the same neoprene formulation as the tube and extruded in a length of about 500 feet.

The knitted tubes and covers for all the hose samples of groups A through E were then cut to a length of about 24 inches and mounted on a conventional curved metal curing mandrel having the configuration of a radiator hose where each was vulcanized in open steam at a temperature of about 300° F. for about 20 minutes. The final vulcanized hoses A through E had an inside diameter of about 1.75 inches and a wall thickness of from about 0.15 of an inch to about 0.25 of an inch.

After the hoses were vulcanized and removed from their respective mandrels they were tested in the following manner. Hose samples of groups A, B, and C were tested for bursting strength and vacuum-collapse resistance at room temperature. The bursting test to measure the hose bursting strength under the application of hydrostatic pressure was performed in accordance with the procedures as specified by the American Society for Testing and Materials in the chapter entitled "Standard Methods of Testing Rubber Hose" ASTM Designation D-380, paragraph 14. The results of the bursting test as determined by averaging the results of two or more samples from each test are given in Table I.

The vacuum-collapse test to measure resistance to collapse under a continuously increasing vacuum pressure was performed as follows: A plug was inserted in both ends of the hose sample to be tested and each sample was supported only at its ends with the remainder of the hose being unsupported. It should be mentioned at this point that the test sample must be at least 6 inches long in order that a proper collapse test be performed since samples of less length will not readily collapse because the end plugs provide support for the hose. A continuously increasing vacuum was applied to the hose through a small opening in one of the plugs by means of a vacuum pump included as part of a vacuum pumping system. The vacuum pressure to which each hose sample was subjected was measured in inches of mercury by an ordinary monometer inserted in the plug at the same end of the hose sample as the vacuum pump. The results were duly recorded both at the start of collapse and when the collapse was complete as determined by visual observation. An average of two or more samples for each group was determined and is presented in Table I.

Hoses of groups D and E were first heat aged in an over and then subjected to the vacuum-collapse test as outlined above. Hose group D was heated at a temperature of about 212° F for about 55 minutes and hose group E was heated at the same temperature for about 50 minutes. These results were also recorded and are presented in Table I.

TABLE I

| Hose Groups | Burst (psi) (ASTM-D-380) | Vacuum Collapse (inHg) Start | Complete |
| --- | --- | --- | --- |
| A (production-rayon) | 132[1] | 3[1] | 3½[1] |
| B (11 knits/inch-room temp) | 162[1] | 5½[1] | 6[1] |
| C (14 knits/inch-room temp) | 182[1] | 7[1] | 7½[1] |
| (11 knits/in. 55 min/212°F) | | 4 | 4½ |
| E (14 knits/in. 50 min/212°F) | | 5½ | 6 |

[1]Average results of two or more samples.

The results shown in Table I clearly indicate the superior bursting strength and vacuum-collapse resistance of the hose samples of groups B and C produced in accordance with this invention when compared to group A which are regular production samples. It should also be emphasized that the production procedures and basic hose construction of groups A and B were nearly identical except for the kind and treatment of fabric. The collapse resistance of hoses of groups D and E even after being subjected to boiling temperature is superior to that of group A samples indicating that the hoses of this invention will perform satisfactorily under high temperature conditions to which they will be subjected during the operation of a vehicle engine.

EXAMPLE II

Five groups of radiator hose samples of the same general dimensions as hoses A through E of Example I were manufactured and are labeled F, G, H, I, and J, respectively. Group F was composed of regular production hoses manufactured in the identical manner and with the same construction as hoses of group A of Example I except that the tube and cover was composed of a butyl elastomer instead of a neoprene elastomer. Hose groups G through J were produced in accordance with the present invention in the identical manner as hose groups B through E of Example I, however, with these following differences in construction: The tube and cover were composed of a butyl elastomer instead of neoprene, the polyester greige cord was of a 2200 denier, 1100/2, 5 turns per inch construction and the knit construction was of a diamond-lock stitch construction instead of a regular lock stitch construction, with the samples of groups G and I having 12 knits per inch and the samples of groups H and J having 14 knits per inch.

About a 21-hour drying time was allowed for the tube and knit of the hoses of groups G through J after the dipping operation and prior to application of the cover. The knitted tubes and covers were cured on a 3 foot 1¾ inch straight mandrel and an 18-inch sample of each vulcanized hose was tested in the same or approximately the same manner as the hoses of groups A through E of Example I. The test results are presented in Table II.

TABLE II

| Hose Groups | Burst (psi) (ASTM-D-380) | Vacuum Collapse (inHg)[2] |
| --- | --- | --- |
| F (production rayon) | 129[1] | 2[1] |
| G (12 knits/inch room temp) | 212[1] | 12[1] |
| H (14 knits/inch room temp) | 185[1] | 10[1] |
| I (12 knits/in. 45 min/212°F) | | 7 |
| J (14 knits/in. 45 min/212°F) | | 6 |

[1] Average results of two or more samples.
[2] Only the value at complete collapse was recorded.

The results shown in Table II again illustrate the superior bursting strength and vacuum-collapse resistance of the hoses produced by the present invention as compared to regular production hoses. The results also indicate that the diamond-lock stitch construction provides a higher degree of both bursting strength and vacuum-collapse resistance when compared to the results in Example I.

EXAMPLE III

Several radiator hose samples having an inside diameter of about 1-¾ inches and a wall thickness of from about 0.15 of an inch to about 0.25 of an inch were produced from three different polymers, ethylene propylene terpolymer (EPDM), butyl, and neoprene. The hoses were produced in accordance with the present invention in three groups with the hoses in each group being of the same polymeric or elastomeric material. The EPDM hoses are labeled as group K, the butyl hoses as group L, and the neoprene hoses as group M.

The hoses were produced in a similar manner to the hoses of previous Examples I and II. The polyester cord construction was 2200 denier, 1100/2, 5 turns per inch, S or Z twist. About 100 feet of each type of polymer was extruded into a tube and knitted with a diamond-lock stitch knit construction having about 12 knits per inch. After the knitting operation a solution of 25 percent polyisocyanate (Mondur-MR) in trichloroethylene was sprayed onto the knitted tube by use of a conventional spraying unit. After a suitable drying period the covers were applied and each group of hoses was cured on a curved metal mandrel at the appropriate time and temperature corresponding to each polymer. Each group of hoses K, L, and M were subjected to tests for bursting strength, vacuum-collapse resistance at room temperature and to a series of heat-aging tests of increasing severity from 45 minutes through 72 hours at 212° F. The test data are recorded in Table III.

TABLE III

| Test | Group K (EPDM) | Hoses Group L (Butyl) | Group M (Neoprene) |
| --- | --- | --- | --- |
| Burst (psi) | 163[1] | 173[1] | 174[1] |
| Vacuum collapse (inHg) | | | |
| Room Temperature | 11.5[1] | 14.1[1] | 8.5[1] |
| 45 min/212°F. | 7.0 | 6.5 | 6.5 |
| 24 hr/212°F. | 7.0 | 6.0 | 6.5 |
| 48 hr/212°F. | 7.0 | 6.5 | 6.5 |
| 72 hr/212°F. | 7.0+ | 7.0 | 7.0+ |

[1] Average results of two or more samples.

The test data indicate that all three types of polymeric materials can be used successfully for the tubes and covers of the hose of this invention and all provide satisfactory bursting strength and vacuum-collapse resistance both at room temperature and when subjected to high temperatures for long periods of time. The EPDM elastomer appears to provide a higher degree of vacuum-collapse resistance at high temperature than either the butyl or neoprene elastomers and for this reason may be especially suited for radiator hose applications.

EXAMPLE IV

Two groups of radiator hose samples were produced having an inside diameter of about 1½ inches and a wall thickness of from about 0.15 of an inch to about 0.25 of an inch. These groups were labeled N and P, respectively. Two other groups of radiator hose samples were produced having an inside diameter of about 1¾ inches and a wall thickness of about the same dimensions as groups N and P. These groups are labeled O and Q, respectively.

The hoses of groups N through Q had an EPDM tube and cover and were reinforced by a polyester knit fabric of 12 to 13 knits per inch produced from a polyester cord having a gauge of about 0.017 of an inch and of 2000 denier, 1000/2, 2.5 turns per inch, Z twist construction. The hose samples of groups N and O were sprayed with a 20 percent solution of polyisocyanate (Mondur-MR) in a trichloroethane solvent. The hose samples of groups P and Q were not treated with the isocyanate solution.

After the spraying operation samples of each group were vulcanized on straight curing mandrels and tested for bursting strength and vacuum-collapse resistance in the manner as described in previous examples. The test results are shown in Table IV.

TABLE IV

| Tests[1] | Hose Groups Sprayed | | Unsprayed | |
| --- | --- | --- | --- | --- |
| | N(1½) | O(1¾) | P(1½) | Q(1¾) |
| Burst (psi) | 187 | 176 | 114 | 93 |
| Vacuum Collapse (inHg) | | | | |
| Room Temperature | | | | |
| No collapse | 23 | 13½ | 12 | 10 |
| Collapse | 23½ | 14 | 13 | 10½ |

[1] All results average of two or more samples.

These results indicate that the treated knit fabric hoses of groups N and O are superior in both bursting strength and vacuum-collapse resistance to the untreated knit fabric hoses of groups P and Q. In addition, the hoses of groups N and P, respectively, having an inside diameter of about 1½ inches have a higher vacuum-collapse resistance than the hoses of group O and Q, respectively, which have an inside diameter of about 1¾ inches. However, it is significant in this regard that the 1¾ inch inside diameter hoses of group O reinforced by treated polyester fabric have a higher average vacuum-collapse resistance than the 1½ inch inside diameter hoses of group P which are reinforced by untreated polyester fabric. The results also indicate that a lower concentration of polyisocyanate (Mondur-MR) can be used with very satisfactory results.

EXAMPLE V

Polyester cord samples of a similar but larger size than the type used to form the knitted fabric reinforcement for radiator hoses were tested to determine their chemical resistance.

Samples of polyester cords having a gauge of from about 0.040 of an inch and a 6600 denier 1100/2/3, 5.3Z, 3.0S construction and not treated by an isocyanate solution are labeled cord A. Other samples of the same polyester cord which were immersed in a 27 percent solution of polyisocyanate (Mondur-MR) in toluene (commercially available) are labeled cord B.

The cords A and B were tested in the following manner. The original ultimate tensile and elongation were determined on a Scott tester. The ultimate tensile and elongation were also determined after immersion in a 100 percent solution of ethylene glycol for 8 days and 28 days at room temperature. The same determination was made after immersion in a solution of 50 percent ethylene glycol and water for 8 days and 28 days at a temperature of 230° F. The test results were recorded and are reported in Table V.

TABLE V

| Tests | Cords | |
|---|---|---|
| Original | A | B |
| Ultimate Tensile (psi) | 145 | 136 |
| Elongation (%) | 18 | 12 |
| 8 days in solution [1] at room temp. | | |
| Ultimate Tensile (psi) | 142 | 142 |
| Elongation (%) | 16 | 11 |
| 8 days in solution [2] at 230°F. | | |
| Ultimate Tensile (psi) | 110 | 115 |
| Elongation (%) | 20 | 15 |
| 28 days in solution [1] at room temp. | | |
| Ultimate Tensile (psi) | 152 | 146 |
| Elongation (%) | 16 | 12 |
| 28 days in solution [2] at 230°F. | | |
| Ultimate Tensile (psi) | all cords disintegrated | |
| Elongation (%) | | |

[1] 100% solution of ethylene glycol.
[2] Solution of 50% ethylene glycol and 50% water.

The test results indicate that the treated and untreated polyester cords similar to the type used in the hose structure of this invention will maintain adequate physical properties and satisfactorily resist the effects of chemicals, such as ethylene glycol to which the hose will be subjected when being used in the cooling system of an automotive vehicle.

EXAMPLE VI

Two radiator hose samples were produced having an inside diameter of about 1¾ inches and a wall thickness of about 0.15 to about 0.25 of an inch and are labeled R and S, respectively. These hoses were produced with an EPDM tube and cover, a polyester fabric construction of 2000 denier, 1000/2, 2.5 turns per inch, and Z twist knit fabric construction having about 12 knits per inch. The fabric was treated with a 20 percent spray solution of polyisocyanate (Mondur-MR) in trichloroethane solvent. Each sample was cured on a curved metal mandrel in a manner as previously detailed.

Hose R was tested for vacuum-collapse resistance at room temperature and this same sample was then retested with the test results being recorded in Table VI.

TABLE VI

| Hose | Vacuum Collapse (inHg) |
|---|---|
| R First Trail | 14 |
| R Second Trail | 9 |

These results indicate a significant decrease in vacuum-collapse resistance upon retest but reveal that a satisfactory level of vacuum collapse resistance is still present.

Hose S was installed in an automotive cooling system of an automotive vehicle engine and tested for collapse resistance at both room temperature and after heat-aging at a temperature of 250° F. for 70 hours. The test results are presented in Table VII.

TABLE VII

| Hose | Vacuum Collapse (inHg) | |
|---|---|---|
|  | No Collapse | Complete Collapse |
| S (at room temperature) | 6 | 20 |
| S (70 hrs/250°F) | 10 | 13 |

These results clearly indicate that the collapse-resistance hose of this invention performs very satisfactorily under actual operation in an automotive vehicle cooling system even when subjected to substantially high temperatures for extended periods of time.

It is to be understood that in addition to polyester fibers, the hose reinforcements of this invention may be composed of fibers of a synthetic linear condensation polymer such as polyamide. Consequently, in working examples I through VII, where reference is made to polyester, it should be realized that polyamide or nylon fibers can be substituted with substantially the same results.

The synthetic linear polyamides useful in the practice of this invention include those types of polymers which are derived from polymerizable monoaminocarboxylic acids and their amide-forming derivatives (ester, halide, anhydride, and amide), those derived from the reaction of suitable diamines with suitable dibasic carboxylic acids or the amide-forming derivatives of such acids, and those derived from mixtures of the foregoing types of reactants. On hydrolysis with strong mineral acids, the polyamides revert to monomeric bifunctional polyamide-forming reactants. Thus, a polyamide derived from a diamine and a dibasic carboxylic acid yields on hydrolysis with hydrochloric acid, a dibasic carboxylic acid and a diamine hydrochloride. The preferred polyamide or nylon fabric materials for this purpose are known commercially as nylon 6 or nylon 66.

Those skilled in the art should be aware that the collapse-resistant hoses of this invention, having significantly improved bursting strength and resistance to vacuum collapse when subjected to a continuously increasing vacuum, provide a significant advancement in the art. It should also be apparent that, even though this invention has particular application to flexible radiator hoses, the principles of this invention are equally applicable to other type hoses used in applications where the combination of vacuum-collapse resistance and a high degree of flexibility are important considerations.

While certain representative embodiments and details have been shown for the purpose of illustrating the invention, it will be apparent to those skilled in the art that various changes and modifications may be made therein without departing from the spirit or scope of the invention.

What is claimed is:

1. A reinforced hose of flexible polymeric material including a semi-rigid generally circumferentially disposed supporting structure therefor comprising at least a single layer of textile fabric reinforcement having large spaces between the fabric components thereof, at least the major portion of said fabric being composed of fibers selected from the group consisting of polyester and nylon, said fibers including a coating comprising at least a 2 percent solution of an organic polyisocyanate, said reinforcement being embedded in the wall of said hose and being adhered to said polymeric material of said hose primarily by means of a polymeric bond created by the flow of said polymeric material through the spaces between the fabric components of said reinforcement to thereby increase the bursting strength and vacuum-collapse resistance of said hose without the use of a metal wire insert.

2. The hose as claimed in claim 1, wherein said fibers are polyester.

3. The hose as claimed in claim 1, wherein said hose includes at least one curved portion in the length thereof.

4. The hose as claimed in claim 1, wherein said reinforcement is a knitted fabric embedded in the wall of said hose.

5. The hose as claimed in claim 4, wherein the knitted fabric is of a lock-stitch construction.

6. The hose as claimed in claim 4, wherein said hose is capable of withstanding hydrostatic pressure of at least 150 psi when tested according to ASTM D-380.

7. An improved vulcanized radiator hose of flexible polymeric material having an inside diameter of from about ⅞ of an inch to about 3 inches and a wall thickness of from about 0.15 of an inch to about 0.25 of an inch, said hose including: an inner tube of flexible polymeric material; a knitted fabric reinforcement surrounding said inner tube, said fabric reinforcement having large spaces between the knitted fabric components having large spaces between the knitted fabric components thereof and said reinforcement consisting essentially of at least a single layer of fibers selected from the group consisting of polyester and nylon, said fibers including a coating comprising at least a 2 percent solution of an organic polyisocyanate; and an outer cover of flexible polymeric material superposed over said tube and knitted fabric reinforcement, said reinforcement being contained within said hose primarily by means of a polymeric bond created by the flow of the flexible polymeric material of said tube and said cover through the spaces between said knitted fabric components during vulcanization to form a semi-rigid circumferentially disposed supporting structure for the hose, said hose thereby capable of an increased bursting strength when tested according to ASTM D-380 and an increased resistance to vacuum collapse when subjected to a continuously increasing vacuum at room temperature without the use of a metal wire insert.

8. The hose as claimed in claim 7, wherein said fibers are polyester.

9. The hose as claimed in claim 7, wherein said hose has an inside diameter of from about ⅞ of an inch to about 2¼ inches and is capable of withstanding a vacuum pressure of greater than 3½ inches of mercury when at least a 6-inch section thereof is subjected to a continuously increasing vacuum at room temperature.

10. The hose as claimed in claim 9, wherein said hose has an inside diameter of from about 1½ inches to about 2¼ inches.

11. The hose as claimed in claim 7, wherein said hose includes at least one curved portion in the length thereof.

12. The hose as claimed in claim 7, wherein the flexible polymeric material is selected from the group consisting of ethylene propylene terpolymer, butyl and neoprene.

13. The hose as claimed in claim 7, wherein said coating comprises a solution of from about 10 percent to about 30 percent of an organic polyisocyanate in a non-reactive solvent selected from the group consisting of trichloroethylene, trichloroethane, and toluene.

14. The hose as claimed in claim 7, wherein the knitted polyester fabric is of a lock-stitch construction.

* * * * *